(12) United States Patent
Bronson et al.

(10) Patent No.: US 6,985,990 B2
(45) Date of Patent: Jan. 10, 2006

(54) SYSTEM AND METHOD FOR IMPLEMENTING PRIVATE DEVICES ON A SECONDARY PERIPHERAL COMPONENT INTERFACE

(75) Inventors: Timothy C. Bronson, Vestal, NY (US); John M. Sheplock, Raleigh, NC (US); Phillip G. Williams, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/114,020

(22) Filed: Mar. 29, 2002

(65) Prior Publication Data

US 2003/0188074 A1    Oct. 2, 2003

(51) Int. Cl.
G06F 13/36    (2006.01)
(52) U.S. Cl. .................. 710/306; 710/311; 710/312; 710/8; 710/9; 710/10
(58) Field of Classification Search ........... 710/306, 710/305, 311, 312, 10, 9, 8
See application file for complete search history.

(56) References Cited

U.S. PATENT DOCUMENTS

| | | | | |
|---|---|---|---|---|
| 5,517,646 A | * | 5/1996 | Piccirillo et al. ............. 713/1 |
| 5,628,027 A | * | 5/1997 | Belmont ....................... 710/1 |
| 5,761,448 A | * | 6/1998 | Adamson et al. ........... 710/104 |
| 5,828,899 A | * | 10/1998 | Richard et al. ............... 710/8 |
| 5,835,784 A | * | 11/1998 | Gillespie et al. ............ 710/10 |
| 5,848,249 A | | 12/1998 | Garbus et al. .............. 395/308 |
| 5,894,563 A | | 4/1999 | Saperstein ................. 395/309 |
| 5,978,860 A | * | 11/1999 | Chan et al. ................... 710/8 |
| 6,003,097 A | | 12/1999 | Richman et al. ............... 710/8 |
| 6,094,699 A | | 7/2000 | Surugucchi et al. ........ 710/128 |
| 6,141,708 A | | 10/2000 | Tavallaei et al. ............. 710/62 |
| 6,173,341 B1 | | 1/2001 | Emerson et al. ............... 710/8 |
| 6,189,063 B1 | * | 2/2001 | Rekeita et al. .............. 710/311 |
| 6,233,641 B1 | | 5/2001 | Graham et al. ............. 710/131 |
| 6,260,094 B1 | * | 7/2001 | Davis et al. ................. 710/314 |
| 6,275,888 B1 | | 8/2001 | Porterfield .................. 710/129 |
| 6,308,234 B1 | | 10/2001 | Davies et al. ............... 710/104 |
| 6,349,347 B1 | * | 2/2002 | Porterfield .................... 710/10 |
| 6,457,069 B1 | * | 9/2002 | Stanley .......................... 710/8 |
| 6,636,927 B1 | * | 10/2003 | Peters et al. ................ 710/309 |

OTHER PUBLICATIONS

TechFest, "PCI Local Bus Technical Summary", 1999, TechFest.com, http://www.techfest.com/hardware/bus/pci.htm.*

Eureka Technology, "EP440 PCI-PCI Bridge", Eureka Technology, Inc., http://www.eurekatech.com/products/pci/ep440.htm.*

(Continued)

Primary Examiner—Glenn A. Auve
Assistant Examiner—Justin King
(74) Attorney, Agent, or Firm—Shelley M Beckstrand; William E. Schiesser

(57) ABSTRACT

Private devices are implemented on the secondary interface of PCI bridge by re-routing the activation of device select signals (IDSEL) during the address phase of a Type 0 configuration operation on the secondary bus in response to a Type 1 configuration operation on its primary bus. Under control of a mask register and device select reroute circuit, if a configuration command on the primary interface attempts to activate the IDSEL line associated with one of the private, or reroute, devices on the secondary interface, a different IDSEL is activated to select a monitoring device on the secondary interface.

15 Claims, 5 Drawing Sheets

OTHER PUBLICATIONS

PCI Special Interest Group, "PCI-to-PCI Bridge Architecture Specification", 1998, PCI Special Interest Group, Rev. 1.1, pp 11-13 and 19-30.*

*PCI Local Bus Specification (Revision 2.2)* Hillsboro, Oregon: PCI Special Interest Group, 1998 [Sections 3.2.2.3, 3.2.2.3.1, and 3.2.2.3.5].

*PCI-to-PCI Bridge Architecture Specification (Revision 1.1)* Hillsboro, Oregon: PCI Special Interest Group, 1998 [Section 3.1 through 3.1.2.1.1].

*IBM 133 PCI-X Bridge R2.0 Datasheet.* Hopewell Juncion, New York: IBM Microelectronics Divigion, 2001. 35-38, 94-95, 111-112.

* cited by examiner

SYSTEM AND METHOD FOR IMPLEMENTING PRIVATE DEVICES ON A SECONDARY PERIPHERAL COMPONENT INTERFACE

BACKGROUND OF THE INVENTION

1. Technical Field of the Invention

This invention relates to peripheral component interfaces. More particularly, it relates to implementing private devices on a secondary PCI or PCI-X bus and to monitoring progress of initialization sequences by a central system resource.

2. Background Art

During a normal system initialization sequence, a central system resource performs multiple PCI or PCI-X configuration commands to detect and initialize all PCI or PCI-X devices and bridges. High function adapters which include a processor and multiple chips are often implemented on a PCI or PCI-X bus that is attached to the system via a bridge. In such adapters, it is often desirable to "hide" the devices on the secondary bus from the central resource and allow their initialization to be handled by the processor contained on the adapter.

There are two types of configuration commands executed on a PCI or PCI-X bus: Type 0 and Type 1. A Type 0 configuration transaction is used to access a device on the current bus segment and a Type 1 configuration transaction is used to access a device that resides behind a bridge. What type of configuration transaction is being executed is, for example, distinguished by address bits on an A/D bus. If, for example, address bits AD [1::0] are 00b during a configuration transaction, a Type 0 configuration is being used. If address bits AD[1::0] are 01b, a Type 1 configuration is being used. A Type 0 configuration transaction is not forwarded across a bridge from its primary interface to its secondary interface, but is used to configure a bridge or other PCI devices that are connected to the PCI bus on which the Type 0 configuration transaction is generated. A Type 1 configuration transaction is used to address a device that does not reside on the current bus segment and may be forwarded to another bus segment by a bridge.

A bridge only responds to Type 0 configuration transactions on its primary PCI interface when being configured, ignores configuration transactions that originate on its secondary interface, and does not implement IDSEL on its secondary interface. During a Type 1 configuration transaction, a bridge compares a PCI bus number in address bits on the address/data bus, and determines from configuration registers if that bus number is one which the bridge should claim and forward across the bridge.

A PCI interface includes a pin designated initialization device select (IDSEL) which is used as a chip, or device, select during configuration read and write transactions. How a system generates IDSEL is system specific, but by convention this may be done as follows. During the address phase of a Type 0 configuration transaction, the IDSEL signal associated with device number 0 is connected to address/data bus AD[16], IDSEL of device number 1 is connected to AD[17], and so on until IDSEL of device number 15 is connected to AD[31].

There is a need in the art for an improved process to selectively prevent, or thwart, IDSEL generation in order to implement private devices. Existing approaches for implementing private devices block the activation of IDSEL pins according to the contents of a special mask register.

It is an object of the invention to provide an improved system and method for allowing initialization of devices on an adapter to be handled by a processor contained on the adapter.

It is a further object of the invention to provide a system and method for selectively preventing interface device selection generation in order to implement private devices on a PCI bus or the like.

It is a further object of the invention to provide a system and method for hiding devices on secondary bus from a central resource to allow their initialization to be handled by a processor on that secondary bus.

SUMMARY OF THE INVENTION

A system and method for operating a peripheral component interface bridge according to steps including initializing a first device on a secondary interface of the bridge for redirection; accepting on a primary interface of the bridge a configuration operation accessing the first device; and redirecting the configuration operation to a second device on the secondary interface.

Other features and advantages of this invention will become apparent from the following detailed description of the presently preferred embodiment of the invention, taken in conjunction with the accompanying drawings.

BEST MODE FOR CARRYING OUT THE INVENTION

The PCI/PCI-X Device Select Reroute Mechanism of the preferred embodiment of the invention provides a system and method for implementing private devices on a secondary peripheral component interface, such as a PCI or PCI-X bus, as well as for monitoring the progress of initialization sequences performed by the central system resource.

Initialization of devices by a host system comprises a predictable sequence of events. During initialization, the host CPU will attempt to read the configuration register device ID from every possible device location on a given bus. An intelligent agent, or monitoring device, such as a processor or some circuitry associated with a processor—could, knowing the predicable nature of configuration, determine when the host CPU completes initialization on the secondary bus of the bridge. The subsystem on the secondary interface of the bridge can use this monitoring feature to monitor the progress of initialization by the host CPU. This enables the computer subsystem on the secondary bus to synchronize its initialization activities with those of the host CPU as needed.

Figure 1:
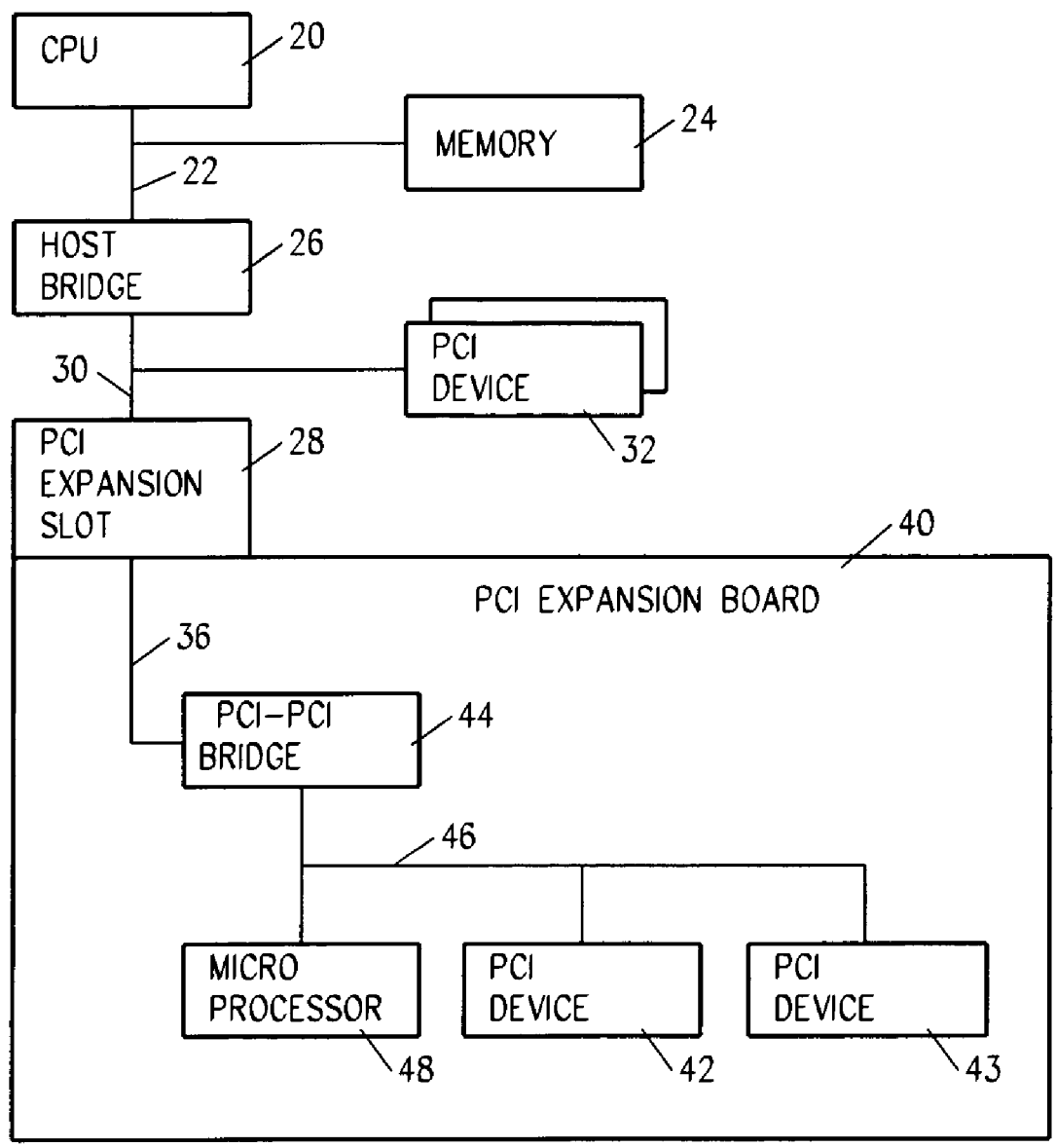
FIG. 1 is a high level block diagram of a system including a PCI bus and bridge.

Referring to FIG. 1, in a computer system that uses the PCI (or PCI-X) bus 30 to connect its I/O devices 32, 42, 43 all the PCI devices 32, 42, 43 are visible to the host CPU 20. The devices are discovered during system initialization by an initialization agent (typically BIOS). After discovery, system resources (such as address space and interrupt vectors) are allocated to the devices 32 and the devices are initialized (enabled for data transfer activity). In accordance with the present invention, however, PCI devices 42, 43 may be rendered private, and not visible to the host CPU 20.

PCI expansion board 40 contains PCI devices 42, 43 on the secondary bus 46 of a PCI-to-PCI bridge 44 (this could also be a PCI-X to PCI-X bridge or the like, PCI-X is a set of enhancements to PCI that also includes backward compatibility to PCI operation).

PCI expansion boards 40 vary in complexity and compute power. High function expansion boards 40 (also referred to as high function I/O adapters) are beneficial because they can off load some of the I/O tasks from the host CPU 20, thereby increasing overall system performance. In such a high function expansion board 40, there is often a microprocessor 48 residing on the secondary bus 46 of the PCI-to-PCI bridge 44. This microprocessor 48 and some of its supporting devices (not shown) may actually comprise a computer system, referred to as a computer subsystem because it is part of a bigger computer system directed by the host CPU 20. The computer subsystem 48 implemented on the secondary bus 46 of a PCI-to-PCI bridge 44 may need to own some of the PCI devices 42, 43 on the secondary bus 46. That is to say, some of the devices 42, 43 on the secondary bus 46 may not need system resources assigned by the host processor 20. Their initialization and subsequent data transfer activities are directed by the microprocessor 48 residing on the expansion board. In order to achieve this, the normal PCI initialization algorithm used by the host CPU 20 must be thwarted, and discovery of the devices 42 in question must be prevented so that they can be private with regard to the computer subsystem 48 contained on the PCI expansion board. The bridge of interest to the present invention is PCI-to-PCI Bridge 44 which is contained on PCI expansion board 40. For bridge 44 the primary bus is PCI bus 36 on expansion board 40, which connects through expansion slot 28 to bus 30, and the secondary bus is bus 46.

The discovery of PCI devices 32, 42, 43 during system initialization is achieved, as previously described, through the use of configuration commands issued by the host CPU 20. The operation of these configuration commands is further described in *PCI Local Bus Specification* (Revision 2.2). Hillsboro, Oreg.: PCI Special Interest Group, 1998, Sections 3.2.2.3, 3.2.2.3.1, and 3.2.2.3.5 (including the implementation note in this section); and also in *PCI-to-PCI Bridge Architecture Specification* (Revision 1.1). Hillsboro, Oreg.: PCI Special Interest Group, 1998, Section 3.1 through section 3.1.2.1.1.

Figure 2:
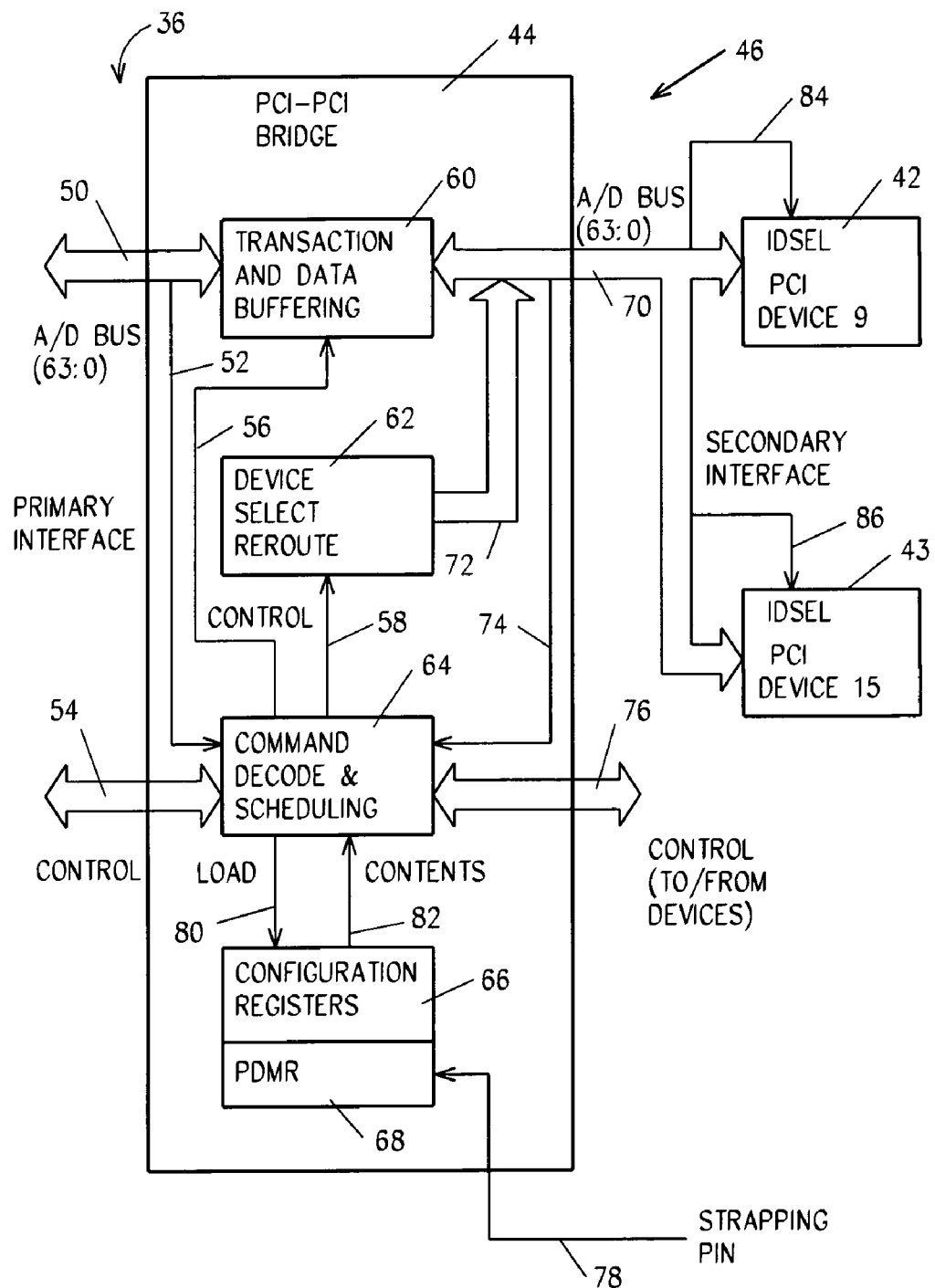
FIG. 2 is a high level block diagram of bridge.

Referring to FIG. 2, PCI-PCI bridge 44 has primary interface 36 and secondary interface 86. Primary interface 36 includes address/data bus 50 and control bus 54, and secondary interface 46 includes address/data bus 70 and control bus 76, with secondary interface buses 70, 76 connected to devices 43, 43 and primary buses 50, 54 connected through expansion slot 28 and host bridge 26 to processor 20. Transactions and data on A/D buses 50, 70 are buffered by transaction and data buffering 60. Control logic in bridge 44 connected to A/D bus 50, 70 includes device select reroute circuitry 62, command decode and scheduling circuitry 64, and configuration registers 66, including Secondary Bus Private Device Mask Register (PDMR) register 68. As is represented by lines 52, 74, command data is fed from A/D buses 50, 70 respectively to command decode and scheduling circuitry 64, control outputs of which are fed on lines 56, 58 to transaction and data buffering 60 and device select reroute circuitry 62, respectively. Command decode and scheduling circuitry is connected to control bus 54 on the primary interface and control bus 76 on the secondary interface to and from devices 42, 43. Configuration registers, including PDMR register 68 are loaded by command decode and scheduling circuitry 64 over line 80, and the contents read back on line 82. Control and PDMR control signals are fed over line 58 to device select reroute circuitry 62, the output of which is fed by bus 72 to A/D bus 70 on secondary interface 46. Optional strapping pin 78 is fed to PDMR register 68, and IDSEL inputs to devices 42, 43 are connected from A/D bus 70 by lines 84, 86, respectively.

In operation, transaction and data buffering 60 holds data in preparation for loading to A/D busses 50, 70. A/D busses 50, 70 are multiplexed, and transactions which go out in address phase are modified in accordance with the present invention under control of device select reroute 62 over bus 72. When a command comes in on primary bus 50, it is fed on line 52 to command decode 64 and there converted to device decode lines 113–115 of FIG. 4 for input to device select reroute 62. Private device mask bit lines 110–112 are fed to device select reroute 62 from PDMR 68 through command decode & scheduling 64 via lines 66 82 and 58. The logic executed by device select reroute 62 in response to these inputs, and the resulting output, is described hereafter in connection with FIG. 4. Configurations registers 66 are loaded by command decode and scheduling circuitry 64 on line 80. Control bus 54 on primary interface and control bus 76 on the secondary interface support such activities as identifying command types on the PCI bus during the address phase, arbitration functions, and so forth.

In accordance with the preferred embodiment of the present invention, private devices 42, 43 are implemented by re-routing the activation of IDSEL rather than simply blocking it. If a configuration command attempts to activate the IDSEL line 84, 86 associated with one of the private devices 42, 43, a different IDSEL is activated instead. This is controlled by a mask register 68. The activation of the IDSEL reroute mechanism may be achieved by programming mask register 68, but this may not be possible prior to the execution of the system initialization by BIOS. For this purpose a special strapping pin 78 is provided on the bridge 44. If this pin 78 is activated, a default value is inserted into the reroute mask 68 to enable the IDSEL reroute function at reset or power up to create several private devices immediately after power is applied to the bridge.

In accordance with an exemplary embodiment of the invention, a PCI/PCI-X Device Select Reroute Mechanism, contained within an IBM 133 PCI-X bridge chip 44, allows configuration commands on primary bus 36 targeted for devices on its secondary bus 46 to be selectively routed to a different device. The devices whose intended commands are rerouted to a different device are henceforth referred to as rerouted devices. The device that receives the commands intended for the rerouted devices is henceforth referred to as the monitoring device. In the example of FIG. 2, device 42 is a rerouted device and device 43 is a monitoring device. The monitoring device 43 need not respond to the rerouted configuration commands, it can monitor the progress of system initialization by merely sampling the activation of its IDSEL pin.

In the IBM 133 PCI-X Bridge, the PCI/PCI-X Device Select Reroute Mechanism is implemented such that devices 13, 9 (this is device 42 of FIG. 2), 7, 6, 5, 4, and 1 may be selected as rerouted devices and device 15 (this is device 43 of FIG. 2) is the default monitoring device. A generalization of this mechanism would allow any device 1 through 15

(two of which, devices 9 and 15, are labeled 42, 43, respectively, in FIG. 2) to be selected as a rerouted device and any device 1 through 15 to be selected as a monitoring device. Regarding the device numbers, PCI configuration commands that traverse bridge 44 are restricted to selecting (targeting) a finite set of devices, 1 through 15. Any of the fifteen may be the target of a configuration command and any of the fifteen may be selected to receive the rerouted commands. However, implementing the reroute mechanism to allow rerouting for all fifteen devices is unnecessary, and for the purpose of this exemplary embodiment, PCI device 42 (device 9) and PCI device 43 (device 15) have been selected for potential rerouting.

The PCI/PCI-X Device Select Reroute mechanism includes one or more configuration registers 66, device select reroute control circuitry 62, and an optional strapping pin 78. The PCI/PCI-X Device Select Reroute Mechanism of the present invention is an improvement on the PCI Local Bus, the PCI-to-PCI Bridge Architecture, and the PCI-X Addendum to the PCI Local Bus described in the following specifications, the teachings of which are incorporated by this reference.

1. PCI Special Interest Group, *PCI Local Bus Specification, Revision* 2.2, Dec. 18, 1998.
2. PCI Special Interest Group, *PCI-to-PCI Bridge Architecture Specification, Revision* 1.1, Dec. 18, 1998.
3. PCI Special Interest Group, *PCI-X Addendum to the PCI Local Bus Specification, Revision* 1.0a, Jul. 24, 2000.

These references also describe a convention which associates certain devices with certain configuration command AD signal lines. In summary, the conventional association is that the IDSEL pin of device 15 is connected (through a resistor) to the signal line called AD(31), the IDSEL pin of device 14 is resistively connected to AD(30), and so forth ending with the resistive connection of device 1 to AD(17). In the IBM Bridge, device 15 is always the monitoring device, so AD31 is always activated whenever a private (rerouted) device is targeted by a configuration command.

Figure 3:
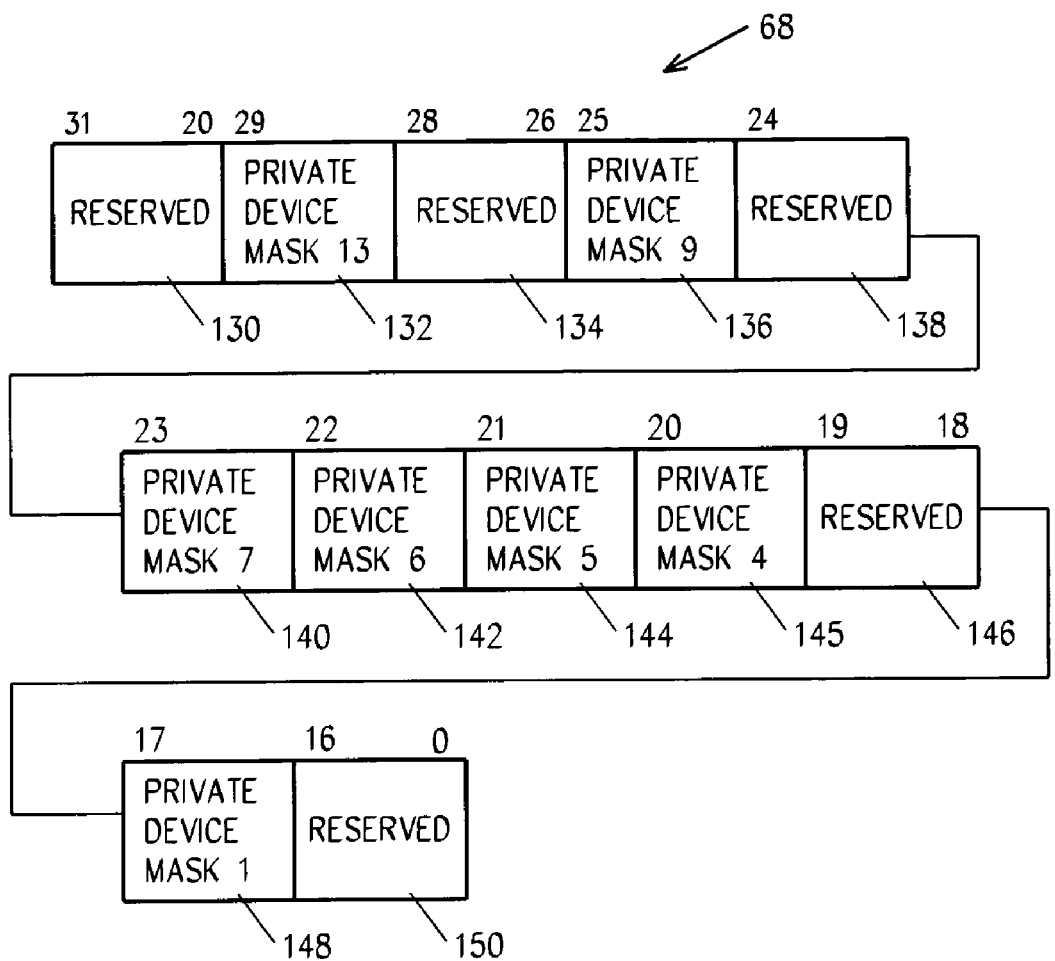
FIG. 3 is a diagram illustrating the content of a device mask register.

Referring to FIG. 3, private device mask register (PDMR) 68 is located within configuration registers 66 at, for example, offset B0, and includes private device masks 132, 136, 140, 142, 144, 145 and 145 for private devices 13, 9 (in the example of FIG. 2, this device 9 is labeled device 42), 6, 5, 4 and 1, respectively. In this exemplary embodiment, the relationship between bits of the PDMR register 68, and the various device masks and signal lines used in this description is set forth in Table 1.

TABLE 1

PDMR REGISTER CONVENTIONS

Figure 4:
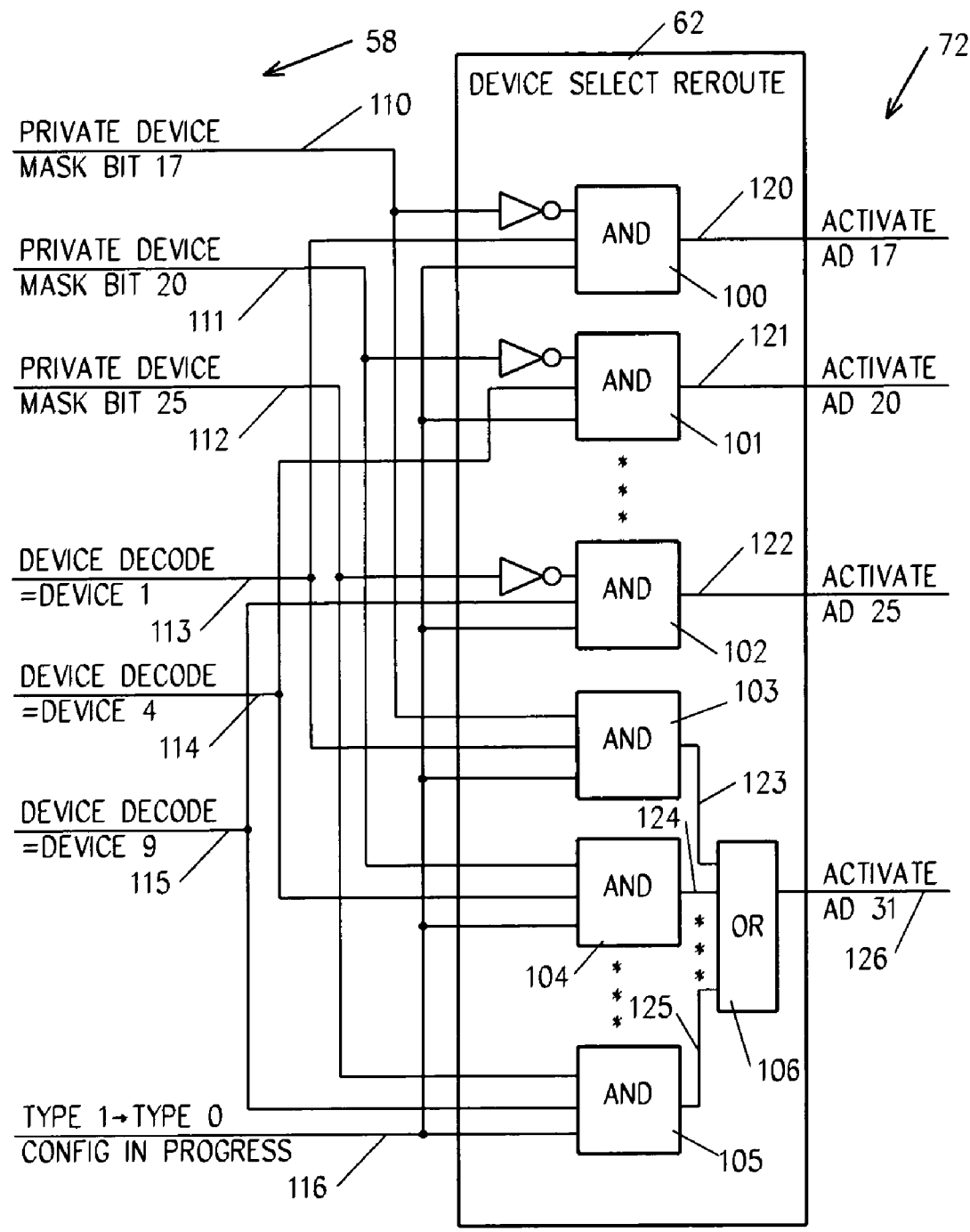
FIG. 4 is a logic diagram illustrating control signal connections for an exemplary embodiment of the device select reroute mechanism of the invention.

| Bit FIG. 4 | Line FIG. 4 | Field FIG. 3 | Description |
|---|---|---|---|
| 0–16 | | 150 | Reserved |
| 17 | 110 | 148 | Private Device Mask 1 |
| 18–19 | | 146 | Reserved |
| 20 | 111 | 145 | Private Device Mask 4 |
| 21 | | 144 | Private Device Mask 5 |
| 22 | | 142 | Private Device Mask 6 |
| 23 | | 140 | Private Device Mask 7 |
| 24 | | 138 | Reserved |
| 25 | 112 | 136 | Private Device Mask 9 |
| 26–28 | | 134 | Reserved |
| 29 | | 132 | Private Device Mask 13 |
| 30–31 | | 130 | Reserved |

In operation, register 68 provides for implementation of private devices on secondary bus 46. The process of converting Type 1 configuration transactions to Type 0 configuration transactions is modified by the contents of this register 68. A configuration transaction that targets a device masked by this register is rerouted to device 15 (43). Setting the secondary bus private device mask register 68 to zeros disables this function.

The configuration register at location B0, referred to as the Secondary Bus Private Device Mask Register (PDMR), controls which configuration commands are redirected to device 15 (43). Bits 17 through 30 of the PDMR correspond to devices 1 through 14 as targeted by Type I configuration operations received on the primary bus of the IBM 133 PCI-X bridge. (See *IBM* 133 *PCI-X Bridge R*2.0 *Datasheet*, Sep. 4, 2001 [available as of March 2002 from http://www-3.ibm.com/chips/techlib].)

When a bit in the PDMR 68 is set to '1', all Type 1 configuration operations which target the corresponding device on the secondary bus of the IBM 133 PCI-X bridge are redirected to device 15 (43). That is, the normal conversion of a Type 1 configuration operation to a Type 0 configuration operation is altered such that AD31 is asserted during the address phase of the resultant Type 0 configuration operation rather than the AD signal prescribed by the PCI Specifications.

Referring to FIG. 4, the connections of intermediate control signals within the IBM 133 PCI-X bridge that are used to implement the PCI/PCI-X Device Select Reroute Mechanism for devices 1, 4, and 13 are illustrated. Device select reroute 62 includes AND gates 100–105, OR gate 106. Inputs to device select reroute 62 include private device mask bit 17 line 110, which is fed to AND gate 103 and inverted and fed to AND gate 100; private device mask bit 20 line 111, which is fed to AND gate 104 and inverted and fed to AND gate 101; private device mask bit 25 line 112 which is fed to AND gate 105 and inverted and fed to AND gate 102; device decode=device 1 line 113 which is fed to AND gates 100, 103; device decode=device 4 line 114 which is fed to AND gates 101, 104; device decode=device 9 line 115 which is fed to AND gates 102, 105; and Type 1 to Type 0 configuration in progress line 116, which is fed to each of AND gates 100–105. The output of AND gate 100 is activate AD17 line 120, of AND gate 101 is activate AD20 line 121, and of AND gate 102 is activate AD25 line 122. The outputs of AND gates 103–105 are fed on lines 123–125 to OR gate 106, the output of which is activate AD31 line 126.

Figure 5:
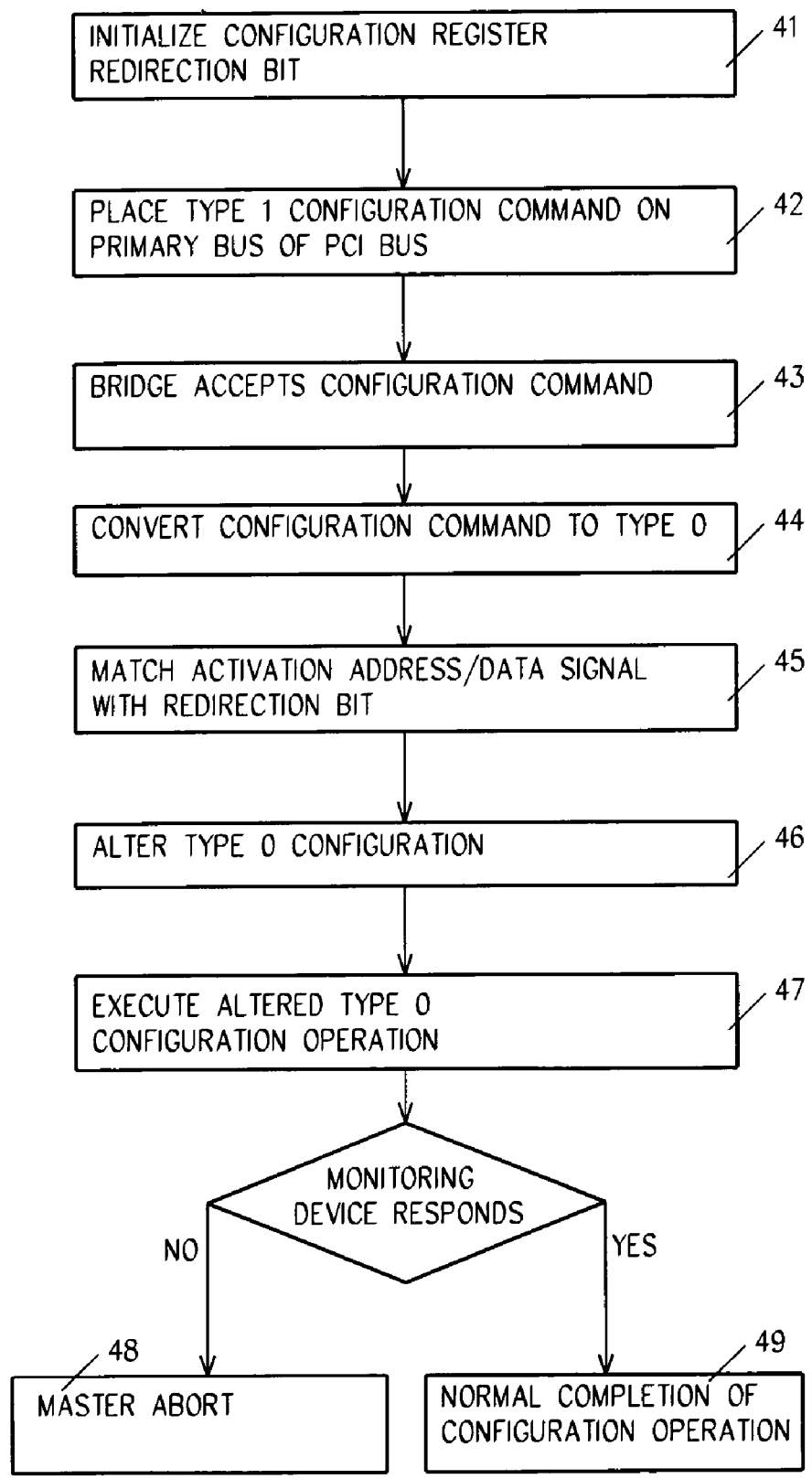
FIG. 5 is a logic flow diagram illustrating the operation of an exemplary embodiment of the invention.

Referring to FIG. 5, an exemplary embodiment of the method of the invention sets forth an event sequence which illustrates the operation and effects of the PCI/PCI-X Device Select Reroute Mechanism.

In step 41, a redirection bit in the configuration register, such as bit 25 of the PDMR, is set to '1'.

In step 42, a Type 1 configuration command is placed on the primary bus of a peripheral component interface bus, such as the IBM PCI-X 133 bridge. By way of example, during an address phase of this operation, the target bus field is equal to the secondary bus number of the IBM PCI-X 133 Bridge, and the device field is 9.

In step 43, the command is accepted by the bridge.

In step 44, the command enters the normal conversion process to a Type 0 configuration operation. Control circuitry within the bridge schedules the appropriate Address/Data signal, in this example AD25, for activation during the address phase.

In step 45, a comparison by the PCI/PCI-X Device Select Reroute Mechanism matches the scheduled activation of AD25 with bit 25 of the PDMR.

In step 46, the Type 0 configuration operation in progress is altered such that the scheduled assertion of the Address/Data signal (in this example, AD25) associated with the rerouted device is canceled and assertion of the Address/Data signal (in this example, AD31) associated with the monitoring device is scheduled instead.

In step 47, the Type 0 configuration operation is executed on the secondary bus of the bridge. AD31 is asserted during the address phase of the operation.

In step 48, if there is no monitoring device present, or the monitoring device monitors but does not respond to rerouted configuration commands, the operation ends in master abort, indicating to the original author of the operation that no device 9 exists on the bus. In step 49, if there is a monitoring device present and the monitoring device does respond to the rerouted configuration commands, then the operation is successfully executed on the secondary bus.

In the preceding scenario, a private device whose IDSEL is resistively connected to AD25 will not respond to the Type 0 configuration command. An intelligent agent (i.e. a processor) residing on the secondary bus of the bridge is free to select the device and configure it without concern for subsequent modifications by the central system resource.

Advantages over the Prior Art

It is an advantage of the invention that there is provided an improved system and method for allowing initialization of devices on an adapter to be handled by a processor contained on the adapter.

It is a further advantage of the invention that there is provided a system and method for selectively preventing interface device selection generation in order to implement private devices on a PCI bus or the like.

It is a further advantage of the invention that there is provided a system and method for hiding devices on secondary bus from a central resource to allow their initialization to be handled by a processor on that secondary bus.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for operating a peripheral component interface bridge, said bridge including a primary interface to a primary bus and a secondary interface to a secondary bus, with an I/O processor and a plurality of devices on said secondary bus, to prevent a host processor from modifying private devices on said secondary bus, comprising the steps of:
   initializing a first device on said secondary bus as a rerouted device for redirection;
   initializing a second device on said secondary bus as a monitoring device for monitoring activation of multiple ID select pins via a single initialization device (ID) select pin;
   accepting on said primary interface of said bridge a configuration operation from said host processor of Type 1 accessing said first device; and
   while converting said configuration operation to a Type 0 configuration operation, redirecting said Type 0 configuration operation to said monitoring device, said redirecting including operating a mask register controlling rerouting activation of device select commands addressed to any of a plurality of ID select pins selectively to a single or fewer than all ID select pins.

2. The method of claim 1, said initializing a first device step including setting a redirection bit in a configuration register corresponding to said first device.

3. The method of claim 2, further comprising the step using a strapping pin for setting said redirection bit upon power on or reset of said bridge.

4. The method of claim 1, further comprising the steps of:
   initializing redirection indicia corresponding to said first device;
   receiving at said primary interface of said bridge a Type 1 configuration command addressed to said first device;
   said redirecting step further comprising:
      converting said Type 1 configuration command to a Type 0 configuration command for said secondary interface with said first device scheduled for activation during an address phase on said secondary bus;
      matching said scheduled activation of said first device with said redirection indicia;
      responsive to said matching step, altering said Type 0 configuration command with said monitoring device scheduled for activation during said address phase on said secondary bus; and
      executing said Type 0 configuration command on said secondary bus.

5. The method of claim 4, further comprising the step responsive to there being, or receiving no response from, said second device during execution of said Type 0 configuration command on said secondary bus, of aborting said Type 0 configuration command on said secondary bus.

6. The method of claim 4, further comprising the steps of:
   monitoring progress of configuration commands received at said primary interface and redirected to said second device; and
   synchronizing execution of configuration commands received at said primary interface from a host CPU with execution of configuration commands originating with a processor on said secondary interface.

7. System for implementing private devices on a secondary interface to prevent a host processor on a primary interface from modifying said private devices, comprising:
   a bridge for connecting said primary interface and said secondary interface; and a reroute mechanism including a mask register on said bridge for rerouting a device select command addressed by said host processor to a rerouted device on said secondary interface to a monitoring device on said secondary interface, said mask register controlling rerouting activation of said device select commands addressed to any of a plurality of initialization device (ID) select pins selectively to a single ID select pin, said monitoring device for monitoring activation of multiple ID select pins via a single ID select pin.

8. The system of claim 7, said bridge further comprising:

a primary address and data bus on said primary interface;

a secondary address and data bus on said secondary interface;

a buffer for buffering transactions and data on said primary and secondary address and data buses;

a private device mask register for identifying devices on said secondary interface as said reroute devices;

a device select reroute circuit responsive to a configuration command on said primary address and data bus addressed to said rerouted device, and further responsive to said private device mask register, for addressing said monitoring device on said secondary interface.

9. The system of claim 8, further comprising a strapping pin for initializing said private device mask register upon power on or reset of said bridge.

10. The system of claim 8, further comprising a processor on said secondary interface for configuring said reroute device.

11. The system of claim 10, further comprising a monitor circuit responsive to configuration commands directed to said monitoring device for synchronizing configuration operations by a host CPU on said primary interface with configuration operations by said processor on said secondary interface.

12. A program storage device readable by a machine, tangibly embodying a program of instructions executable by a machine to perform method steps for operating a bridge, said bridge including a primary interface to a primary bus and a secondary interface to a secondary bus, with an I/O processor and a plurality of devices on said secondary bus, to prevent a host processor from modifying private devices on said secondary bus said method steps comprising:

initializing a first device on said secondary bus for redirection;

initializing a second device on said secondary bus as a monitoring device;

accepting on said primary interface of said bridge a configuration operation from said host processor of Type 1 accessing said first device; and while converting said configuration operation to a Type configuration operation, redirecting said Type 0 configuration operation to said monitoring device, said redirecting including operating a mask register controlling rerouting activation of device select commands addressed to any of a plurality of initialization device (ID) select pins selectively to a single or fewer than all ID select pin; said monitoring device for monitoring activation of multiple ID select pins via a single ID select pin.

13. The program storage device of claim 12, said method steps further comprising the steps of:

said initializing step further comprising the step of initializing redirection indicia corresponding to said first device on said secondary interface of said bridge;

said accepting step including receiving at said primary interface of said bridge a Type 1 configuration command addressed to said first device;

said redirecting step further including converting said Type 1 configuration command to a Type 0 configuration command for said secondary interface with said first device scheduled for activation during an address phase on said secondary bus;

matching said scheduled activation of said first device with said redirection indicia;

responsive to said matching step, altering said Type 0 configuration command with a second device scheduled for activation during said address phase on said secondary bus; and executing said Type 0 configuration command on said secondary bus.

14. The storage device of claim 13, said method steps further comprising the step responsive to there being, or receiving no response from, said second device during execution of said Type 0 configuration command on said secondary bus, of aborting said Type 0 configuration command on said secondary bus.

15. The storage device of claim 13, said method steps further comprising the steps of:

monitoring progress of configuration commands received at said primary interface and redirected to said second device; and synchronizing execution of configuration commands received at said primary interface from a host CPU with execution of configuration commands originating with a processor on said secondary interface.

* * * * *